United States Patent [19]

Flower

[11] 4,372,411
[45] Feb. 8, 1983

[54] TRUCK CAB TILT MECHANISM
[75] Inventor: Wallace C. Flower, McKean, Pa.
[73] Assignee: Lord Corporation, Erie, Pa.
[21] Appl. No.: 274,043
[22] Filed: Jun. 15, 1981
[51] Int. Cl.³ .............................................. B62D 23/00
[52] U.S. Cl. ............................... 180/89.15; 180/89.16; 296/190
[58] Field of Search ............... 180/89.14, 89.15, 89.16; 296/190, 35.1

[56] References Cited
U.S. PATENT DOCUMENTS

| | | | |
|---|---|---|---|
| 2,549,102 | 4/1951 | Kramer | 296/35.1 |
| 2,951,548 | 9/1960 | Crockett | 180/89.14 |
| 3,508,784 | 4/1970 | Small | 296/35.1 |
| 3,606,437 | 9/1971 | Pierce | 296/35.1 |
| 3,857,602 | 12/1974 | Karkau | 180/89.14 |
| 4,203,499 | 5/1980 | Miyata | 296/35.1 |

Primary Examiner—Joseph F. Peters, Jr.
Assistant Examiner—John A. Carroll
Attorney, Agent, or Firm—Thomas L. Kautz

[57] ABSTRACT

A cab tilt assist mechanism is provided for use with a suspension system in a cab-over-engine truck, which is mounted between the cab and frame on either side of the front of the truck and is operable to provide a fixed pivot point about which the cab may rotate during a tilting operation. The tilt assist mechanism herein carries all of the loads imposed by the weight of the cab during a complete cab tilt operation without affecting the stiffness and damping responses provided by the suspension system between the cab and frame.

14 Claims, 10 Drawing Figures

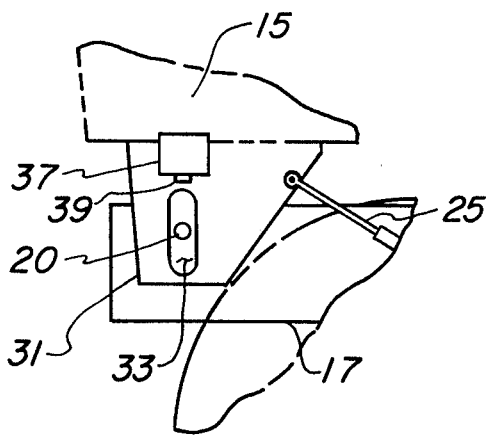
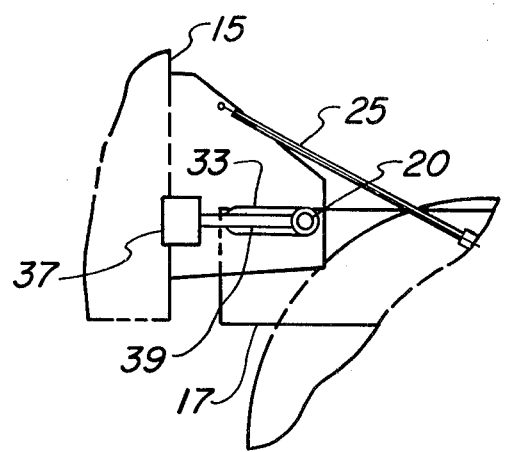
Figure 5A          Figure 5B
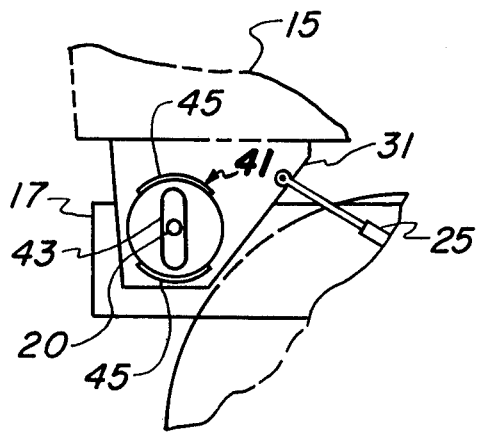
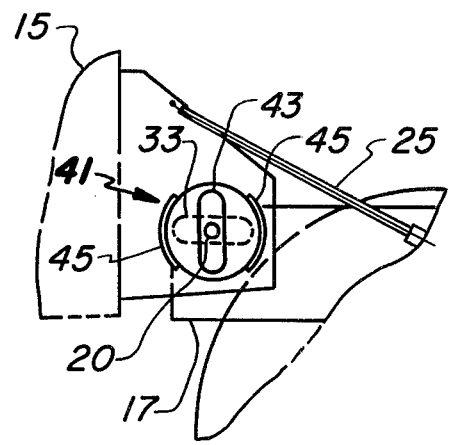
Figure 6A          Figure 6B
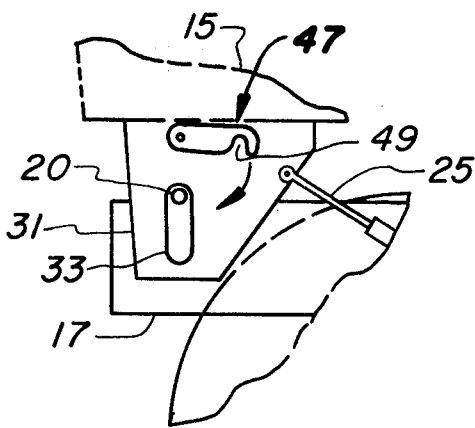
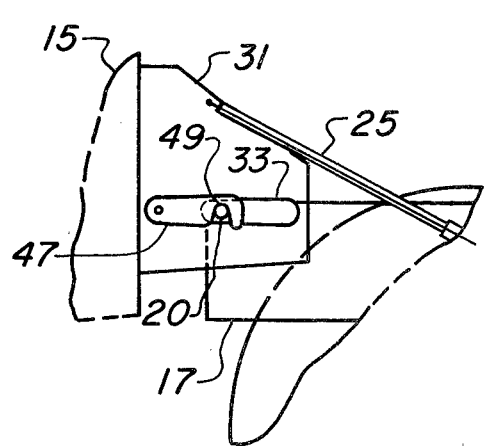
Figure 7A          Figure 7B

TRUCK CAB TILT MECHANISM

FIELD OF THE INVENTION

The subject invention relates generally to the area of truck cab suspension systems, and, more particularly, to a mechanism for protecting the suspension system during the cab tilt operation for a cab-over-engine style tractor.

BACKGROUND OF THE INVENTION

The isolation of vibrations transmitted to the drivers of conventional or cab-over-engine (COE) trucks has been a problem which has attracted a considerable amount of attention among vehicle OEM and component manufacturers for some time. Cabs mounted on the frame separately from the load carrying portion of a truck are subjected to vibrations from the frame, wheels and engine. While wheel vibrations into the truck frame may be reduced at least to some degree by selection of appropriate suspension springs and shock absorbers, and engine vibrations may be isolated with elastomeric mountings, the cab induced vibrations coming from the frame still pose a difficult problem as discussed in U.S. Pat. No. 3,554,596 to LeFevre.

Examples of prior art suspension systems intended to minimize the transmittal of frame vibrations to the truck cab include the rigid metal springs taught in LeFevre and the air spring system disclosed in U.S. Pat. No. 3,948,341 to Foster. Although the LeFevre and Foster suspension systems appear to provide reasonable ride quality, it is believed that superior performance can be achieved using a diaphragm type hydraulic-pneumatic suspension system such as disclosed in U.S. Pat. Nos. 3,479,053; 3,669,225; and 3,802,686 to Moulton. As discussed in detail below, the subject invention is directed to a tilt-assist mechanism adapted for use with such hydraulic-pneumatic suspension systems in a cab-over-engine type truck.

Generally, the suspension unit in a cab-over-engine truck should facilitate tilting of the cab to provide access to the engine without sacrificing the desired vibration isolation capability. It is believed that each of the suspension systems identified above would provide improved ride quality if the metal springs, air springs or hydraulic-pneumatic units were permitted to provide the only stiffness and damping responses between the cab and frame. However, to accommodate the tilting operation required in cab-over-engine trucks and to prevent cab-to-frame separation in crash situations, such elements as pivoting arms and bushings have been included in prior art designs as shown for example in the Foster patent. While not intended to have noticeable influence on the vibration isolation capability of a suspension system, pivoting arms and bushings have the effect of increasing the effective stiffness of a suspension system resulting in a significant degradation of the overall quality of the ride. Therefore, to the extent that such cab tilting assist mechanisms may be removed from cab-over-engine cab suspension systems, the expected ride quality of any system would be improved.

SUMMARY OF THE INVENTION

The subject invention is directed to a mechanism for facilitating the tilting operation of a cab-over-engine truck in combination with the diaphragm-type hydraulic-pneumatic suspension units disclosed in Moulton. This provides a two-fold advantage over existing systems in that not only are the pivot arms and bushings found in prior art designs removed, but the desirable performance features of low stiffness and variable damping achieved in the diaphragm-type hydraulic-pneumatic suspension units are incorporated into the suspension system.

Essentially the subject invention consists of a pair of guide plates extending between the cab and truck frame on either side of the truck, each being formed with a slot at one end to receive a pivot shaft or pin which is mounted to the truck frame. During normal operation of the truck with the cab in the ride position, the guide plates have little or no effect on the stiffness or damping provided by the suspension unit between the frame and cab because the pivot shaft is free to move laterally, fore and aft and vertically within the slot in the guide plate. In sequence with the cab tilting operation, confining means are actuated to releaseably secure the cab pivot shafts in a fixed position along the slot in each of the guide plates. This provides a fixed point about which the cab may pivot, and as discussed in more detail below, acts to protect the hydraulic-pneumatic suspension units from damage during the tilting operation.

Therefore, it is an object of the subject invention to provide a means for facilitating the cab tilting operation in a cab-over-engine truck which has little or no effect on the overall stiffness or damping capability of the suspension system.

It is another object of the present invention to provide a pair of guide plates attached on either side of the truck between the cab and truck frame which are slotted at one end to receive a cab pivot shaft which acts as a fixed pivot point about which the cab may be rotated without damaging the elements of the suspension system.

It is a further object of the subject invention to provide a pair of guide plates extending between the truck frame and cab on either side of a cab-over-engine truck having a slot at one end which receives a cab pivot shaft, in combination with confining means operable to releaseably secure the pivot shaft in a fixed position along the guide plate slots to provide a fixed pivot point about which the truck cab may rotate.

DESCRIPTION OF THE DRAWINGS

Objects in addition to the foregoing will become apparent upon consideration of the following specification taken in conjunction with the accompanying drawings wherein:

FIG. 5A is an alternate embodiment of the confining means of the subject invention with the cab in the ride position.

FIG. 5B is the embodiment shown in FIG. 5A with the confining means shown in the tilt position.

FIG. 6A is still another embodiment of the confining means herein shown in the ride position.

FIG. 6B is the embodiment shown in FIG. 6A with confining means in the tilt position.

FIG. 7A is a further embodiment of the subject confining means in the ride position.

FIG. 7B is the embodiment shown in FIG. 7A with the confining means in the tilt position.

DETAILED DESCRIPTION OF THE INVENTION

Figure 1:
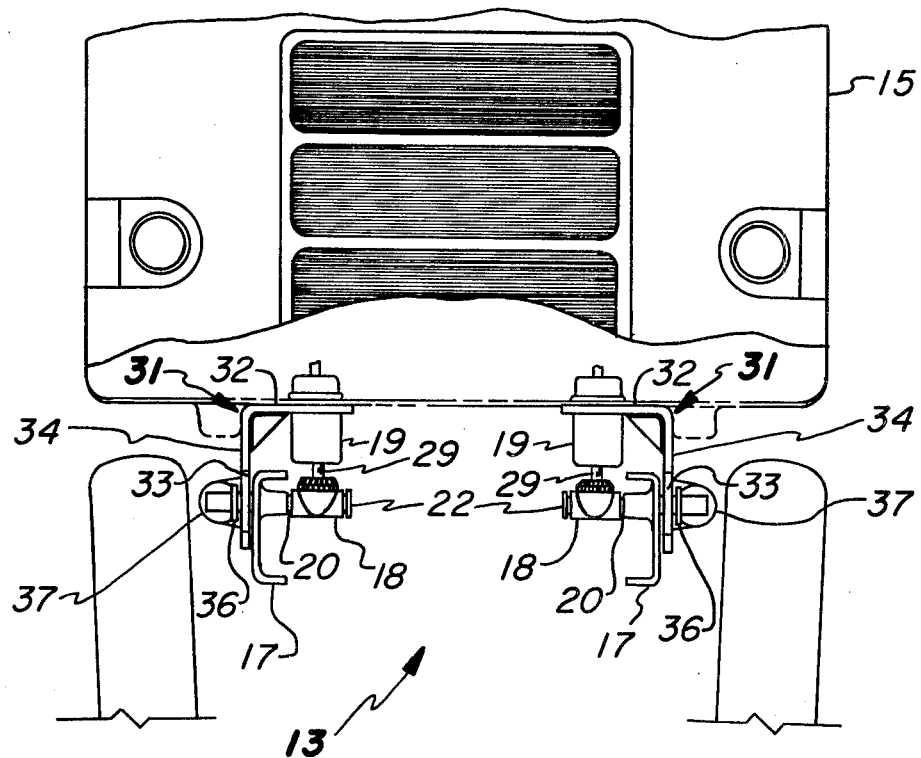
FIG. 1 is a partial front view of a cab-over-engine truck having the modified suspension system of the subject invention.

Referring now to the drawings and in particular to FIG. 1, a suspension system labelled generally with the reference 13 is shown in position between the cab 15 and frame 17 of a cab-over-engine (COE) truck. The suspension system 13 includes a pair of diaphragm-type hydraulic-pneumatic displacer units 19 disposed on either side of the front end of the truck and attaching at their upper end to the cab 15 and at their lower end to a sleeve 18. The sleeves 18 are rotatably mounted to a pair of pivot shafts 20 which attach to frame 17 on either side of the truck. Sleeves 18 are held in place laterally by a cap 22 fixed to the inwardly extending end of each of the shafts 20. In the two-point suspension system shown in the Figures the rear end of cab 15 may be mounted to frame 17 by releaseable latches (not shown). However, it should be understood that a pair of rear displacer units 19 could be used in conjunction with the subject invention to mount the rear of cab 15 to frame 17 for conversion to a four-point suspension system. A pair of lift cylinders 25 are mounted on either side of the frame 17 (only one of which is shown in the Figures) and extend upwardly at an acute angle into engagement with cab 15. When activated, the lift cylinders 25 are operable to move the cab 15 upwardly approximately 90° to accomplish the tilting operation (See FIG. 4).

Figure 2:
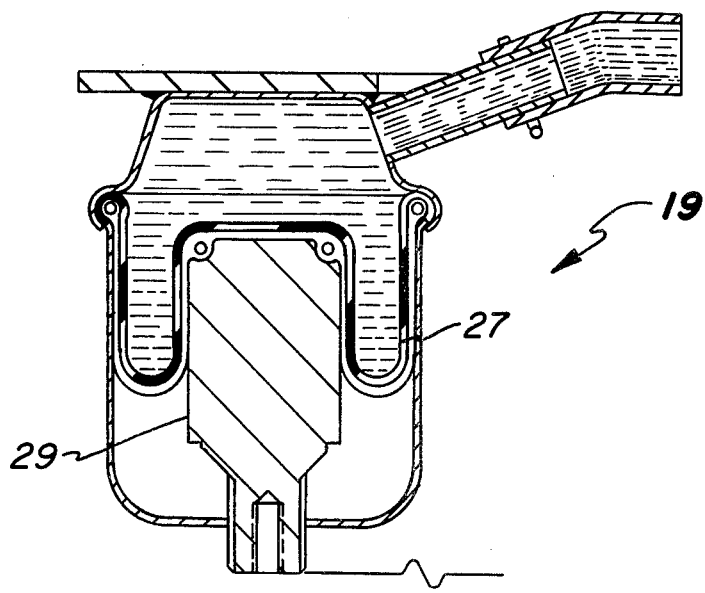
FIG. 2 is a cross-sectional view of a prior art diaphragm-type hydraulic-pneumatic suspension unit.

As shown in FIG. 2 and discussed in detail in the Moulton patents listed above, the hydraulic-pneumatic displacer units 19 include a rolling lobe diaphragm 27 formed of a reinforced elastomer which separates the displacer 19 into two chambers. A piston 29, which is mounted at one end to the sleeve 18, extend upwardly into the displacer 19 and attaches to the diaphragm 27. In combination with other system elements (not shown) the displacers 19 have proven to provide excellent isolation of cab 15 from fore and aft, lateral and vertical vibrations produced at the truck frame 17.

However, it can be appreciated from viewing FIG. 2 that due to their relatively light construction the displacers 19 can neither withstand nor help guide cab 15 through a tilting operation by themselves. If a cab tilt operation was attempted with only the displacers 19, the forward movement of cab 15 would cock the displacer piston 29 relative to the housing of the displacer 19 causing permanent deformation without ever tilting cab 15. Moreover, it is likely that the diaphragm 27 would be torn or pinched against the displacer housing by piston 29 causing additional irreparable damage.

Figure 3:
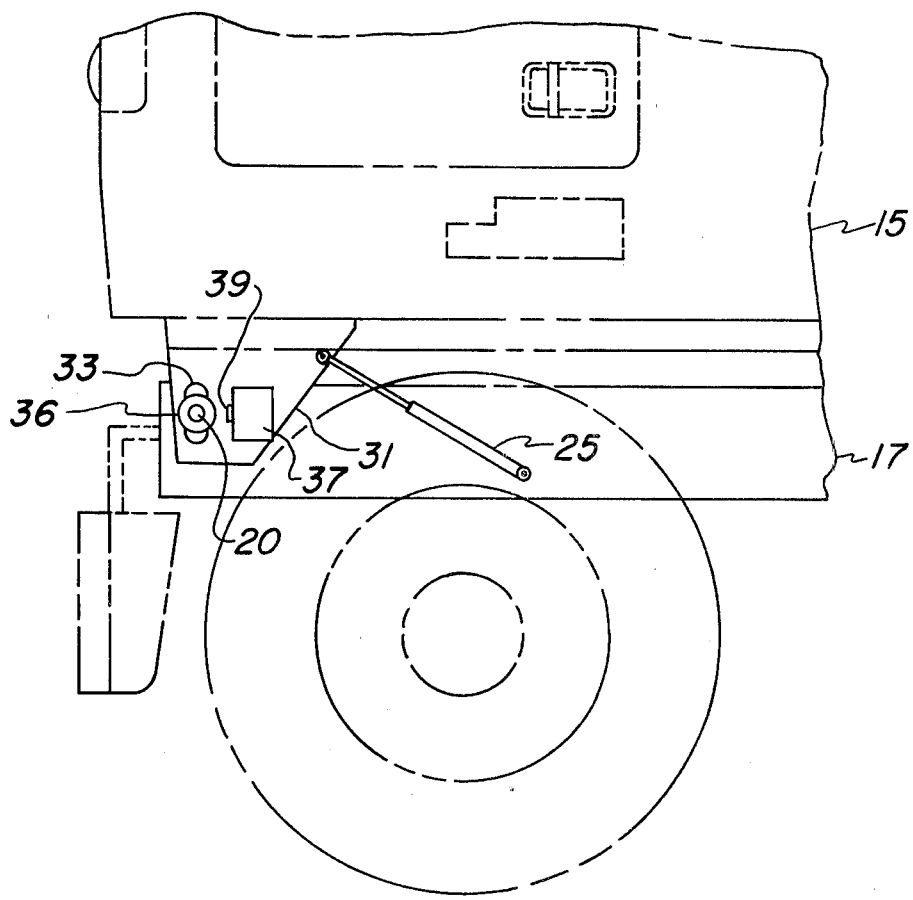
FIG. 3 is a partial side view of a cab-over-engine truck in the ride position which incorporates one embodiment of the subject invention.
Figure 4:
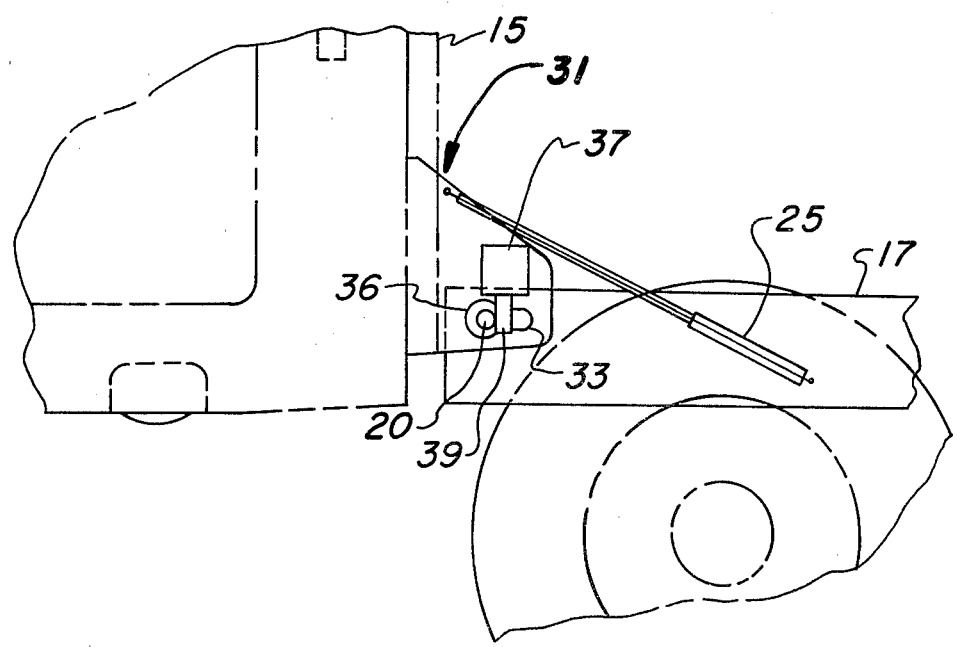
FIG. 4 is a partial side view of a cab-over-engine truck incorporating the embodiment of the subject invention shown in FIG. 3, with the cab being rotated to the tilt position.

As mentioned above, prior art means of assisting the cab tilt operation include the addition of tilt arms or bushings to the suspension system. However, the inherent stiffness added to the suspension system by such tilt-assist mechanisms invariably results in a deterioration of overall ride quality. Referring now to FIGS. 1, 3 and 4, one embodiment of the tilt assist means consists of a pair of guide plates 31 formed in an L-shape with a first section 32 generally perpendicular to a second section 34. The first section 32 of guide plates 31 is disposed adjacent displacers 19 and extends along the base of cab 15 to which it is mounted. The second section 34 extends vertically downwardly from cab 15 to frame 17, and is formed with a vertically oriented elongated slot 33 at its lower end. The shaft 20 extends through slot 33 of second section 34, and a washer 36 may be provided at the adjacent end of shaft 20 to maintain shaft 20 in the proper position during assembly. The slot 33 formed in second sections 34 of each guide plate 31 is dimensioned to permit fore and aft, lateral and vertical movement of shaft 20 therewithin so that under normal ride conditions the guide plates 31 have minimal, if any, effect on the stiffness or damping responses of displacers 19.

The purpose of guide plates 31 is to accommodate the cocking, tensile and compressive loads imposed by the weight and motion of cab 15 during a cab tilt operation, and to provide an additional load path for crash loads. The guide plates 31 effectively protect displacers 19 from such loads without introducing additional stiffness or damping to the suspension system. To enable guide plates 31 to accomplish this function, confining means are provided which are operable to releasably secure shaft 20 in a fixed position along the slot 33 in each of the guide plates 31, thus providing a fixed pivot point about which cab 15 may rotate during a cab tilt operation.

Referring now to FIGS. 3–7B, various embodiments of the confining means herein are shown. It should be understood that while only one side of the truck frame 17 is shown in each of the drawings 3–7B, the other side of the truck frame 17 includes essentially identical structure forming the complete confining means of the present invention. In FIG. 3 (See also FIG. 1), a pair of cylinders 37 having pistons 39 are mounted to respective ones of the second sections 34 of guide plates 31 such that when extended the pistons 39 will move perpendicular to the slots 33 and confine shaft 20 at one end thereof. Cylinders 37 may be pneumatic or can be hydraulically plummed into the cab lift hydraulic cylinder circuit which operates lift cylinders 25. Alternatively, cylinders 37 may be oriented so that pistons 39 move along the length of slots 33 as shown in FIGS. 5A and 5B. In the ride position of cab 15, the pistons 39 are not extended and permit shafts 20 to freely move within slots 33. When actuated during a cab tilt operation, the cylinders 37 move pistons 39 along slots 33 into engagement with shafts 20 to confine them to the lower end of slots 33. Although cylinders 37 are shown in FIGS. 5A and 5B as being mounted above slots 33 on guide plates 31, it should be understood that cylinders 37 could be mounted beneath slots 33 so that when extended the pistons 39 would releasably secure shafts 20 to the upper end of slots 33.

Another embodiment of the confining means herein is shown in FIGS. 6A and 6B. A pair of discs 41 having an elongated slot 43 corresponding to slots 33 is rotatably mounted to each of the second sections 34 of guide plates 31. In the ride position of cab 15, each of the discs 41 are rotated so that their slots 43 align with the slots 33 of guide plates 31 to permit movement of shafts 20 therealong. In advance of a tilt operation, the discs 41 are rotated 90° by means of a worm gear or hydraulic cylinder (not shown) so that shafts 20 are confined at a fixed point along slots 33. To accommodate some of the load applied by the weight of cab 15 to the pivot shaft 20 during a tilt operation, discs 41 may include load-carrying flanges 45 along a portion of their circumference for additional support.

A further embodiment of the confining means of the subject invention is shown in FIGS. 7A and 7B. A pair of cams 47, each formed with a recess 49, are rotatably mounted to respective ones of the second sections 34 of guide plates 31 in a position just above slots 33. During normal operation of the truck, cams 47 are rotated outwardly away from slots 33 as shown in FIG. 7A. As a cab tilt operation is initiated, the cams 47 are rotated by means of a worm gear or hydraulic cylinders (not shown), so that their recess 49 engages shaft 20 to hold it in a fixed position along slots 33.

A typical cab tilt sequence would thus proceed as follows. Initially, the confining means of the subject invention in any of the forms shown in FIGS. 3–7B is actuated to releasably secure shafts 20 in a fixed position along slots 33 in guide plates 31. Once this fixed pivot point is established in each of the guide plates 31, the rear latches may be released and the lift cylinders 25 energized. Cab 15 will move upwardly pivoting about the shafts 20 with the guide plates 31 carrying all of the compressive, tensile, shear and cocking loads imposed by the weight of cab 15. The displacers 19 also pivot with the tilting cab 15 as sleeves 18 rotate about shafts 20, but no loads are imposed on the displacer piston 29 or diaphragm 27.

As is well-known, the loads applied at the pivot shaft 20 will undergo a load reversal before cab 15 tilts through 90°. In the absence of confining means to releasably secure the shafts 20 at a fixed point along slots 33, such load reversal would result in an abrupt change in cab attitude when the vertical load on the shafts 20 changes direction. By confining shafts 20 as noted, the load reversal is accommodated smoothly and protection of the displacers 19 is assured. Returning cab 15 to the ride position is accomplished by simply reversing the order of steps mentioned above, with guide plates 31 carrying all loads at all times during a full cab tilt operation. It should also be noted that the guide plates 31 of the subject invention allow displacers 19 to provide essentially all of the stiffness and damping between cab 15 and frame 17. In the ride position, the shafts 20 are free to move fore and aft, vertically and laterally within the dimensional limits of the slot 33 in guide plates 31 so that no additional stiffness is introduced to the suspension system. The overall ride quality is therefore enhanced without sacrificing stability during the cab tilt operation.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. In a cab-over-engine truck having a cab and frame, a suspension system disposed therebetween to isolate vibration transmitted from said frame to said cab, and lift cylinder means operable to tilt said cab upwardly from said frame during a tilting operation, the improvement comprising a tilt-assist mechanism including load carrying means disposed at either side of said truck, each of said load carrying means being formed with a slot, a pair of pivot means mounted to either side of said frame and extending through said slots in respective ones of said load carrying means, and confining means mounted adjacent respective ones of said load carrying means, said confining means being operable to releasably secure said pivot means at a fixed position along said slot thus forming a fixed pivot point at each of said load carrying means, whereby upon actuation of said lift cylinder means said cab rotates about said fixed pivot points with the forces produced by the weight of said cab being reacted through said tilt assist mechanism.

2. The cab-over-engine truck of claim 1 wherein said load carrying means are a pair of generally L-shaped guide plates each having a first section perpendicular to a second section, said first section extending along the base of said cab and being mounted thereto, said second section extending vertically downwardly from said cab to said frame and being formed with a vertically oriented, elongated slot to receive said pivot means therewithin.

3. The cab-over-engine truck of claim 1 wherein said slot formed in each of the load carrying means is vertically oriented and dimensioned to enable said pivot means to move in the lateral, vertical and fore and aft directions therewithin.

4. The cab-over-engine truck of claim 1 wherein said confining means includes a pair of cylinders each having a piston, said cylinders being mounted adjacent respective ones of said load carrying means such that when activated said cylinders extend said pistons perpendicularly across said slot in each of said load carrying means to releasably secure said pivot means in a fixed position therealong.

5. The cab-over-engine truck of claim 1 wherein said confining means includes a pair of cylinders each having a piston, said cylinders being mounted adjacent respective ones of said load carrying means such that when actuated said cylinders extend said pistons along said slot in each of said load carrying means to releasably secure said pivot means in a fixed position therealong.

6. The cab-over-engine truck of claim 1 wherein said confining means includes a pair of discs each formed with an elongated slot corresponding to said slots in said load carrying means, said discs being rotatably mounted to respective ones of said load carrying means, said discs being rotatable so that said slots therein align with said slots in said load carrying means under normal operating conditions of said truck, and said discs being rotatable 90° so that said slot therein is perpendicular to said slots in said load carrying means for releasably securing said pivot means at a fixed point therealong.

7. The cab-over-engine truck of claim 6 wherein said discs include flanges disposed along at least a portion of the circumference thereof to provide additional load carrying capability during said cab tilt operation.

8. The cab-over-engine truck of claim 1 wherein said confining means includes a pair of cams each formed with a recess, said cams being rotatably mounted to respective ones of said load carrying means, said cams being rotatable to move outwardly from said slots in said load carrying means under normal operating conditions of said truck, and said cams being rotatable toward said slots in said load carrying means so that said recess in said cams engages and releasably secures said pivots in a fixed position along said slots.

9. In a cab-over-engine truck having a cab and frame, a suspension system disposed therebetween to isolate vibrations transmitted from said frame to said cab, and lift cylinder means operable to tilt said cab upwardly from said frame during a cab tilt operation, the improvement comprising a tilt-assist mechanism including a load carrying means disposed at either side of said truck, each of said load carrying means being formed with an elongated, vertically oriented slot, a pair of pivot means mounted to either side of said frame and extending through said slots in respective ones of said load carrying means, said slots having length and width dimensions to provide at least limited movement of said shaft means therewithin in the vertical, lateral and fore and aft directions to enable said suspension system to provide the stiffness and damping response between said cab and frame during normal ride conditions, and confining means mounted adjacent respective ones of said load carrying means, said confining means being operable to releasably secure said pivot means at a fixed position along said slot thus forming a fixed pivot point at each of said load carrying means, whereby upon actuation of said lift cylinder means said cab rotates about said fixed pivot points with the forces produced by the weight of said cab being reacted through said tilt-assist mechanism.

10. The cab-over-engine truck of claim 9 wherein said load carrying means are a pair of generally L-shaped guide plates each having a first section perpendicular to a second section, said first section extending along the base of said cab and being mounted thereto, said second section extending vertically downwardly from said cab to said frame and being formed with a vertically oriented, elongated slot to receive said pivot means therewithin.

11. The cab-over-engine truck of claim 9 wherein said confining means includes a pair of cylinders each having a piston, said cylinders being mounted adjacent respective ones of said load carrying means such that when actuated said cylinders extend said pistons perpendicularly across said slot in each of said load carrying means to releasably secure said pivot means in a fixed position therealong.

12. The cab-over-engine truck of claim 9 wherein said confining means includes a pair of cylinders each having a piston, said cylinders being mounted adjacent respective ones of said load carrying means such that when actuated said cylinders extend said pistons along said slot in each of said load carrying means to releasably secure said pivot means in a fixed position therealong.

13. The cab-over-engine truck of claim 9 wherein said confining means includes a pair of discs each formed with an elongated slot corresponding to said slots in said load carrying means, said discs being rotatably mounted to respective ones of said load carrying means, said discs being rotatable so that said slots therein align with said slots in said load carrying means under normal operating conditions of said truck, and said discs being rotatable 90° so that said slot therein is perpendicular to said slots in said load carrying means for releasably securing said pivot means at a fixed point therealong.

14. The cab-over-engine truck of claim 9 wherein said confining means includes a pair of cams each formed with a recess, said cams being rotatably mounted to respective ones of said load carrying means, said cams being rotatable to move outwardly from said slots in said load carrying means under normal operating conditions of said truck, and said cams being rotatable toward said slots in said load carrying means so that said recess in said cams engages and releasably secures said pivot means in a fixed position along said slots.

* * * * *